(12) United States Patent
Citron

(10) Patent No.: US 9,442,279 B2
(45) Date of Patent: Sep. 13, 2016

(54) OPEN ARCHITECTURE STRUCTURE FOR TROUGH SHAPED SOLAR CONCENTRATORS

(71) Applicant: Jeffrey Michael Citron, Tucson, AZ (US)

(72) Inventor: Jeffrey Michael Citron, Tucson, AZ (US)

(*) Notice: Subject to any disclaimer, the term of this patent is extended or adjusted under 35 U.S.C. 154(b) by 181 days.

(21) Appl. No.: 13/974,542

(22) Filed: Aug. 23, 2013

(65) Prior Publication Data

US 2015/0055236 A1 Feb. 26, 2015

(51) Int. Cl.
| | |
|---|---|
| *G02B 5/10* | (2006.01) |
| *G02B 19/00* | (2006.01) |
| *F24J 2/14* | (2006.01) |
| *F24J 2/16* | (2006.01) |
| *F24J 2/46* | (2006.01) |
| *G02B 7/183* | (2006.01) |
| *F24J 2/07* | (2006.01) |
| *F24J 2/10* | (2006.01) |

(52) U.S. Cl.
CPC ............ *G02B 19/0042* (2013.01); *F24J 2/14* (2013.01); *F24J 2/16* (2013.01); *F24J 2/4638* (2013.01); *F24J 2/07* (2013.01); *F24J 2002/108* (2013.01); *G02B 7/183* (2013.01); *G02B 19/0023* (2013.01); *Y02E 10/45* (2013.01)

(58) Field of Classification Search
CPC ............ G02B 7/183; G02B 19/0042; G02B 19/0019; F24J 2/14; F24J 2/542; F24J 2/5233; Y10T 29/49826; Y02E 10/45

USPC ........ 359/851, 852, 853, 854, 865, 872, 873; 126/684, 685, 687, 696, 700; 136/252

See application file for complete search history.

(56) References Cited

U.S. PATENT DOCUMENTS

| | | | | |
|---|---|---|---|---|
| 4,243,019 A | * | 1/1981 | Severson | F24J 2/14 126/634 |
| 4,519,384 A | | 5/1985 | Murtha | |
| 4,520,794 A | * | 6/1985 | Stark et al. | 126/684 |
| 2010/0236600 A1 | * | 9/2010 | Kimura | F24J 2/14 136/246 |
| 2010/0314509 A1 | * | 12/2010 | Conger | F24J 2/5241 248/121 |
| 2011/0017273 A1 | * | 1/2011 | Roach | F24D 11/0221 136/246 |
| 2011/0067689 A1 | | 3/2011 | Chaves | |
| 2011/0214666 A1 | | 9/2011 | Prahl | |
| 2011/0303214 A1 | | 12/2011 | Welle | |
| 2012/0160302 A1 | * | 6/2012 | Citron | F24J 2/1047 136/248 |

* cited by examiner

*Primary Examiner* — Stephone B Allen
*Assistant Examiner* — Rahman Abdur
(74) *Attorney, Agent, or Firm* — MU Patents; Timothy Marc Shropshire; Garrett James O'Sullivan

(57) ABSTRACT

A method to manufacture and produce trough shaped solar concentrators and concentrating solar collectors that have reduced wind loading compared to comparable prior art trough concentrators is disclosed. Shown are several different types of trough shaped concentrating solar collectors incorporating Open Architecture lattice geometric support structures with aerodynamic treatment of the lattice structural members.

19 Claims, 11 Drawing Sheets

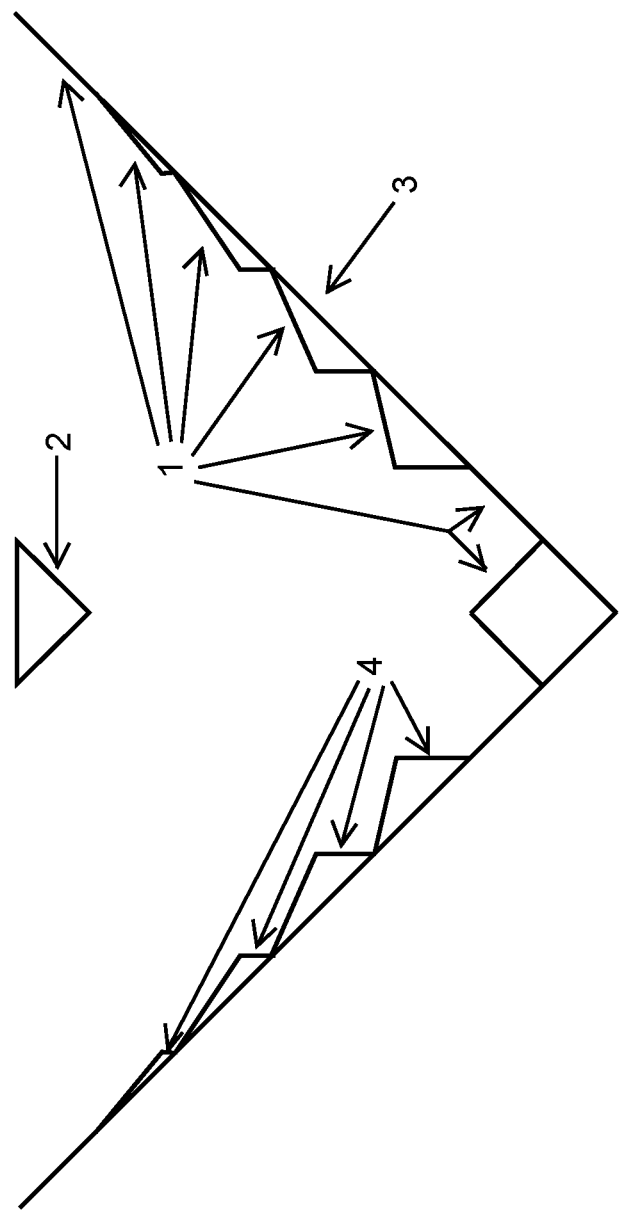

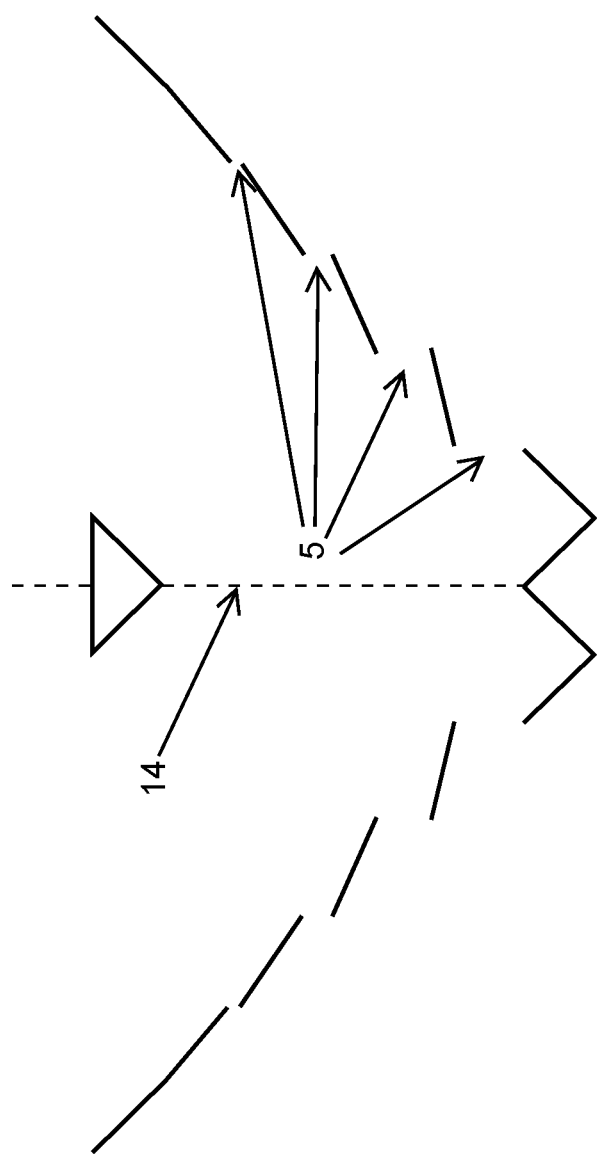

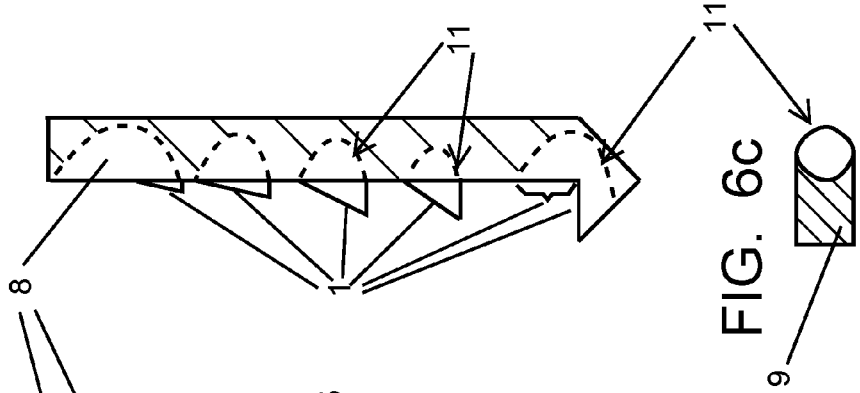
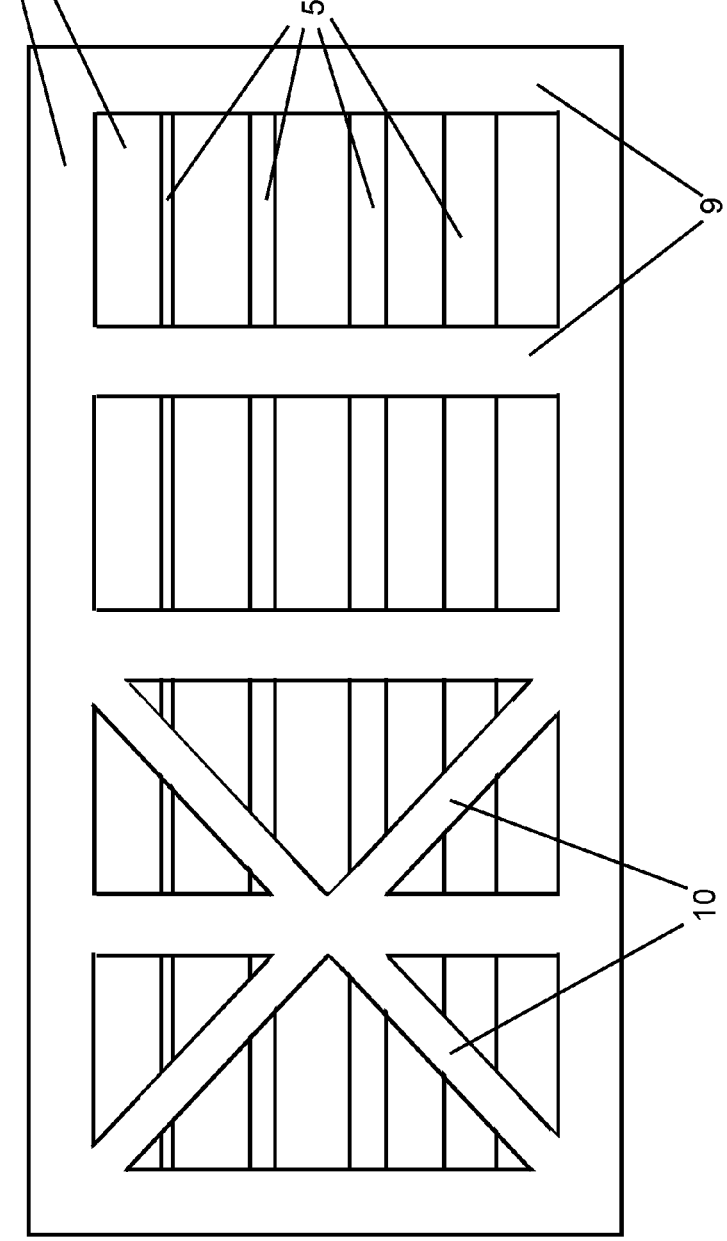

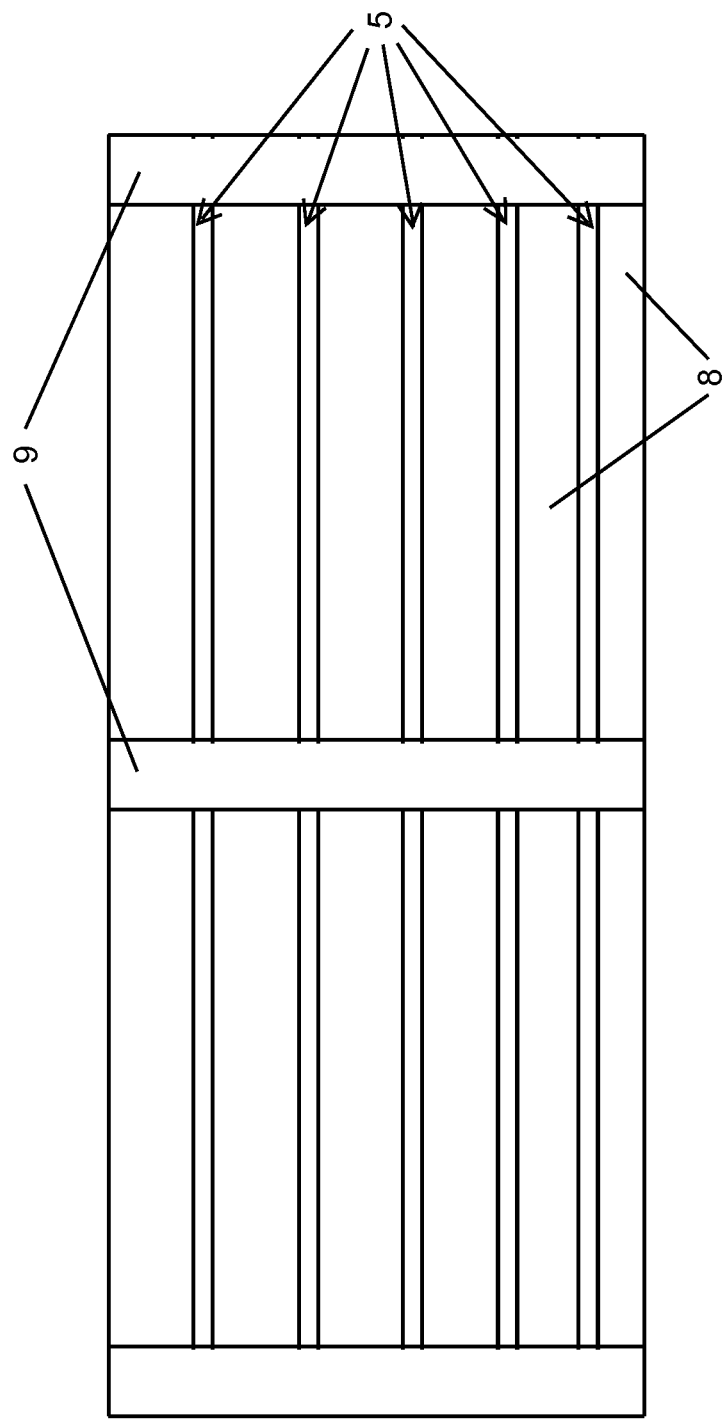

US 9,442,279 B2

OPEN ARCHITECTURE STRUCTURE FOR TROUGH SHAPED SOLAR CONCENTRATORS

This application is based on and claims the priority of this inventor's Provisional Patent Application No. 61/692,291, Filed Aug. 23, 2012.

BACKGROUND OF THE INVENTION

The present invention relates to a structure and a method for constructing trough shaped solar concentrators. The structural elements and method of constructing concentrating solar trough collectors of this invention is intended to substantially reduce wind loading on these structures.

Commercial prior art trough shaped concentrators have had parabolic cross sections. If these concentrators are constructed with high concentration ratio on the receiving element they tend to be large structures. Parabolic trough structures with aperture widths of 20 to 30 feet are common in the Concentrated Solar Power, CSP, solar electric power generation industry. It is obvious that such large structures present large wind loads. Wind loading puts high demand on the support structures of these concentrators. Support for these large parabolic reflectors must be robust to maintain structural integrity during moderate to high wind. In addition, the reflector material and its support structure must be strong enough to prevent flexing of the reflector and resultant defocusing. This is a common problem for parabolic troughs in the CSP industry. Further, since most trough concentrators must track the suns' movement in at least 1 direction, wind loading imposes requirements for robust tracking mechanisms as well. Wind loading for trough shaped solar concentrators is thus a major problem which the present invention is designed to address and reduce substantially.

SUMMARY OF THE INVENTION

The present invention comprises a structural architecture and method for constructing trough shaped solar concentrators that substantially reduces wind loading on such structures. Particularly the present invention comprises a trough shaped concentrator with Fresnelised strip reflectors that are supported by an open lattice structure. The lattice support structure is made of horizontal support members, which also serve as the support members on which the Fresnel strip reflectors are mounted and vertical support members that serve to support the horizontal support members. The horizontal support members are spaced on the vertical support members such that there is space between them through which air can flow. The vertical support members are likewise spaced apart to allow air to flow through the lattice structure. In addition diagonal support members may be incorporated if structural stability dictates. Thus is created a trough concentrator that is open and allows wind to flow through it thus reducing wind loading on the structure. In addition, to further reduce wind loading, the surfaces of all support members that are not optical surfaces may be constructed with aerodynamic contours that part the wind and further reduce wind loading on the structure. The essence of this invention is thus a Fresnelised trough concentrator constructed of an open structural lattice that will substantially reduce wind loading compared to trough concentrators with solid continuous reflectors or backing.

While current commercial trough concentrators have all been parabolic troughs this inventor has recently shown (Pending patent application Ser. No. 13/337,206) a Fresnel trough concentrator incorporating flat Fresnel reflectors. It is to be noted that the current Open Architecture invention can be realized for Fresnel trough concentrators incorporating both, flat and curved, parabolic, Fresnel reflectors.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE DRAWINGS

FIG. 1a is a cross section of this inventor's prior invention of a Trough Shaped Fresnel Reflector Concentrator with flat Fresnel reflector strips and a flat V shaped backing.

FIG. 1b shows the concentrator of FIG. 1a with all but optical reflector elements removed and illustrates the Open Architecture concept of the present invention applied to the concentrator of FIG. 1a.

FIGS. 6a, b and c show views of a lattice support structure for one side of the Fresnel Trough Concentrator shown in FIG. 1b, comprising the Open Architecture of the present invention.

FIG. 6a shows a back view. FIG. 6b shows a side view. FIG. 6c shows a top view of one of the vertical support members.

FIG. 7 shows a rear view of a lattice support structure for the Fresnel Trough Concentrator shown in FIG. 2 and illustrating the Open Architecture structure of the present invention.

DETAILED DESCRIPTION OF THE INVENTION

FIG. 1a is a cross sectional representation of this inventors prior shown invention of a Trough Shaped Fresnel Reflector Solar Concentrator. It shows 1 the Fresnel step reflectors, 2 a receiver for the concentrated solar energy, 3 a flat V shaped backing for the trough and 4 vertical supports for the Fresnel step reflectors. The receiver 2 in this drawing is a triangular tube designed for mounting photovoltaic solar cells but could just as easily be a round tube designed for carrying a flowing fluid to be heated.

FIG. 1b is a cross sectional representation of the Concentrator shown in FIG. 1a with all the structural support elements of the Fresnel trough reflector removed and only the Fresnel reflectors remaining. Where the vertical supports for the Fresnel step reflectors 4 of FIG. 1a were there are now open spaces 5. If an open support structure is then constructed for this new Open Fresnel Trough Concentrator the open spaces 5 between the reflective Fresnel steps will provide open spaces for air to flow thru. This will reduce the wind loading on this new concentrator compared to the concentrator shown in FIG. 1a. The dashed line 14 shows the trough central axis which will serve as a reference for defining the open spaces 5 in this new type of trough concentrator. Examination of this figure shows that the open spaces 5 of this Fresnel reflector configuration are not all equal, some are larger than others. This is due to the Fresnel reflectors of this concentrator having originally been pegged to and constructed on an underlying linear V shaped structure. This uneven spacing between the Fresnel reflector strips is not optimum for reduction of wind loading.

Figure 2:
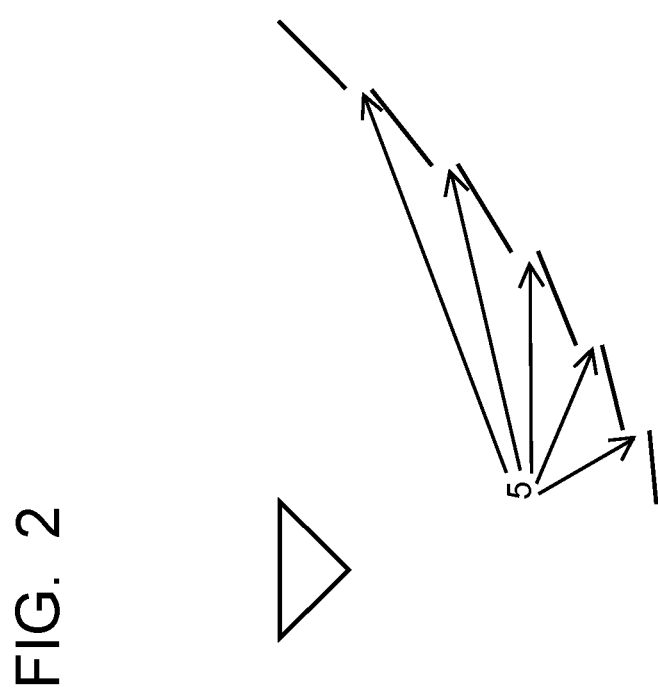
FIG. 2 is a cross section of one side of a Trough Shaped Fresnel Reflector Concentrator with flat Fresnel reflector strips and equal vertical spacing between the Fresnel reflector strips illustrating the Open Architecture concept of the present invention.

FIG. 2 shows a cross-sectional representation of one side of a Fresnel Trough Concentrator with flat Fresnel step reflectors in which the spaces 5 between the Fresnel reflector strips are equal. This drawing demonstrates that the spaces 5 between the Fresnel reflectors can be made equal. Also, the dimension of the equal spaces 5 between the Fresnel reflectors in this representation was chosen arbitrarily, demonstrating that such a concentrator can be made with any spacing 5 desired between its Fresnel reflectors. In this drawing the spaces 5 between the Fresnel reflectors are vertical, that is to say a line drawn between the end of one reflector and the nearest end of the reflector immediately adjacent to it is parallel to the central axis of the trough. Creating vertical spaces does not increase the width of the trough structure compared to an equivalent trough without open spaces. However, it does increase the depth of the trough structure and consequently its overall size. Because the open spaces, in this configuration, are vertical and consequently parallel to the light coming into the trough, all the light entering the trough aperture is reflected by the Fresnel reflectors to the receiver and thus the optical efficiency is maintained and equal to an equivalent trough with no open spaces. When creating the open spaces between the Fresnel reflectors in a trough concentrator the designer must be cognizant of the increase in trough size, depth, and choose a spacing that achieves a balance between open spaces 5 that achieves good air passage thru the structure, reducing wind loading, and the consequent overall increase in trough size. FIG. 2 illustrates the basic concept of the present invention as a Fresnel reflector trough concentrator with open architecture designed to reduce wind loading on the trough structure. FIG. 2 shows a trough concentrator with the same receiver size and essentially the same concentration ratio as the trough concentrator of FIG. 1b.

Figure 3A:
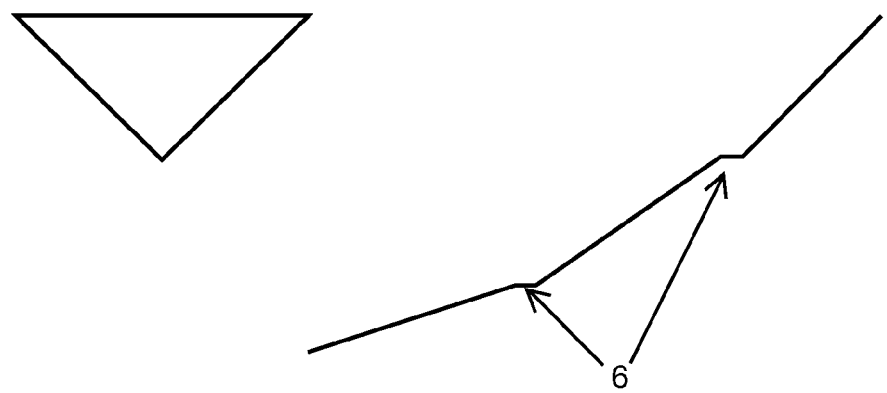
FIGS. 3a and b together illustrate an alternative version of the open architecture concept in which the open spaces are oriented horizontally relative to the trough central axis.

FIG. 3a shows a cross-sectional representation of a trough concentrator with horizontal members 6 connecting the reflectors.

Figure 3B:
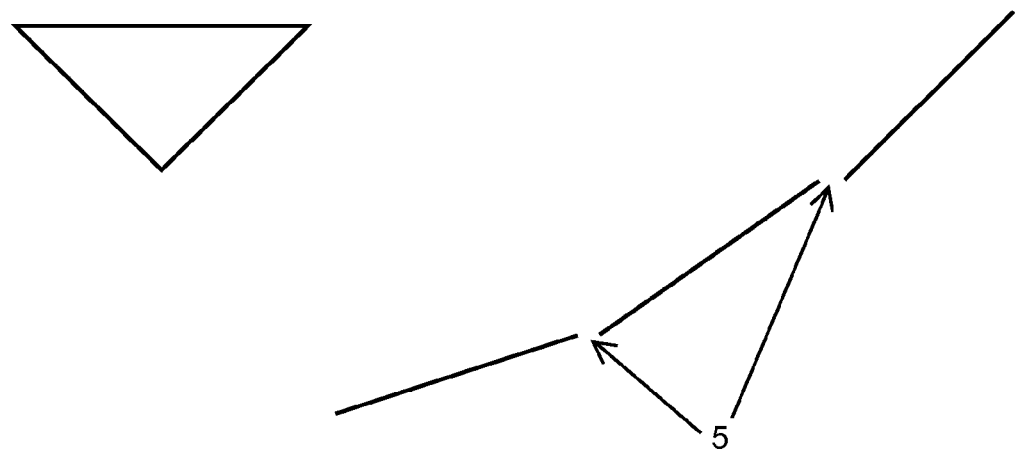

FIG. 3b shows the trough of FIG. 3a with the horizontal members removed to reveal horizontal open spaces 5 which constitutes an alternative embodiment of the present invention. It will be immediately obvious that the horizontal open spaces in this trough will increase its width compared to a trough without open spaces but not its depth or height. Also it will be obvious that some light entering the trough aperture will go through the open horizontal spaces thus reducing its optical efficiency relative to a trough without open horizontal spaces.

Since the reduction of wind loading on the trough structure is the purpose of this invention and this is accomplished by creating open spaces within the trough structure itself, consideration of the effect upon wind loading at different wind angles of attack to the structure must be considered. Because the trough needs to rotate to track the sun as it traverses the sky, the angle of attack of the wind to the trough will necessarily be quite variable because of this rotation as well as the natural variability of wind direction. In addition, the orientation of the open spaces within the trough structure needs to be considered relative to its effect on wind loading at different angles of attack. It appears intuitively obvious that horizontal spacing of the Fresnel reflectors would present less wind loading when the wind angle of attack is parallel to the central axis of the trough. Likewise, it appears intuitively obvious that vertical spacing of the reflectors would present less wind loading when the wind angle of attack is normal to or transverse of the central axis of the trough. Since the wind angle of attack will vary between both of these extreme directions as well as intermediate directions, a compromise or intermediate spacing of the Fresnel strip reflectors seems to suggest itself as a possible best solution for wind load reduction at all wind angle of attack directions.

Figure 4A:
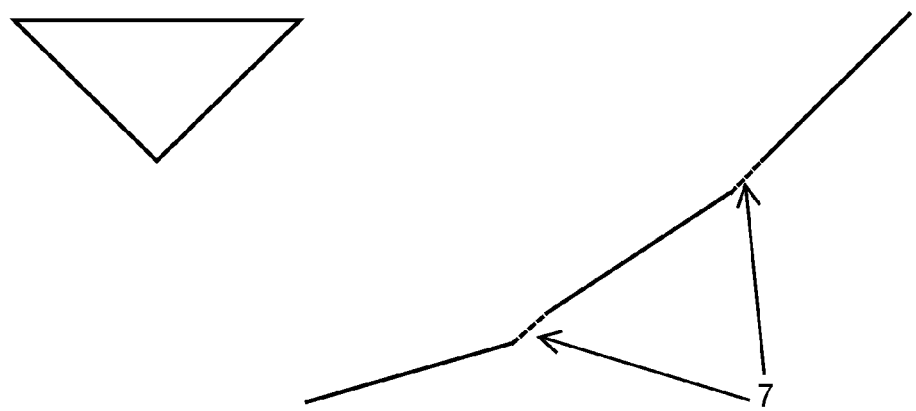
FIGS. 4a and b together illustrate an alternative version of the open architecture concept in which the open spaces are oriented diagonally relative to the trough central axis.

FIG. 4a shows a cross-sectional representation of a trough with a 45 degree member between the reflectors represented by dashed lines 7.

Figure 4B:
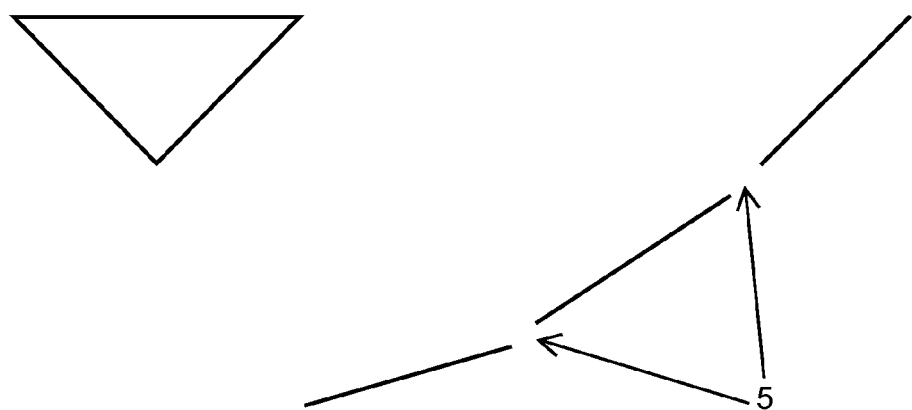

FIG. 4b shows the trough of FIG. 4a with the 45 degree diagonal members 7 removed to reveal 45 degree open spaces 5. In consideration of the above analysis of wind loading relative to wind angle of attack and the direction of the spacing of the Fresnel reflectors, it appears that this 45 degree open spacing between the reflectors may present the best overall reduction in wind loading for all wind angles of attack. Again, it is to be noted that with the 45 degree open spacing both the width and height or depth of the trough are increased relative to a closed trough with no open spaces. Also it is to be noted that with the 45 degree open spaces some of the light entering the trough aperture will pass through the 45 degree diagonal open spaces thus reducing this troughs optical efficiency relative to a closed solid trough. However, if sufficient wind load reduction can be achieved by creating horizontal or diagonal open spaces in the trough then the addition of trough width and the reduction of optical efficiency may be justified. These considerations await empirical testing.

Figure 5:
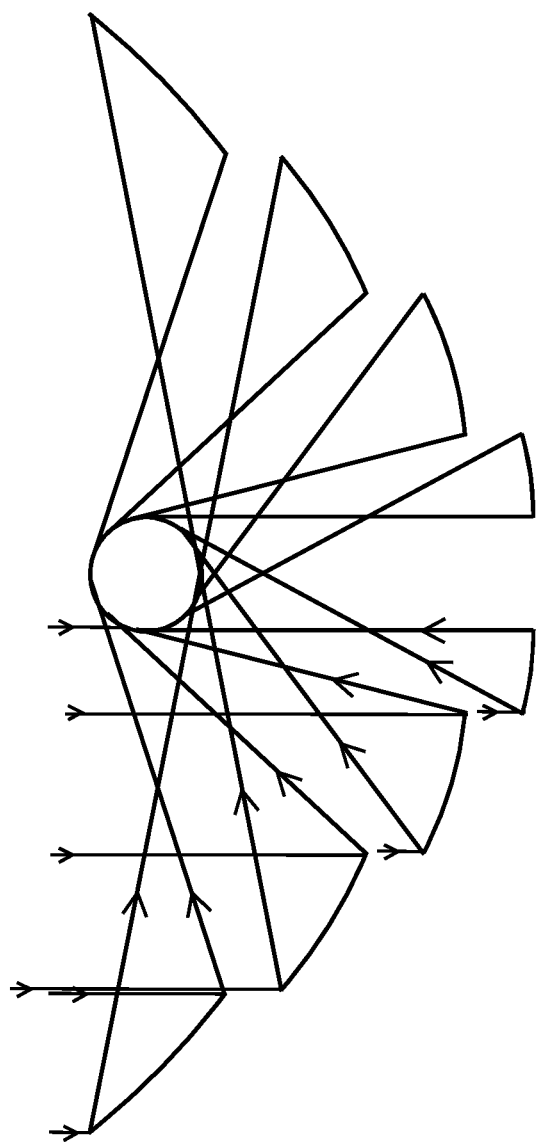
FIG. 5 is a cross section of a Fresnelised Parabolic Trough Concentrator illustrating the Open Architecture concept of the present invention.

FIG. 5 Shows a Fresnelised Parabolic Trough Concentrator showing a round tube receiver and illustrates that the concept of an Open Architecture Trough Concentrator can also be applied to and realized using curved Fresnel reflectors in a parabolic trough concentrator. Typically parabolic trough concentrators are continuous reflector troughs but for the purposes of reducing wind loading they can be made using curved Fresnel reflectors with spaces between them.

Curved parabolic reflector Fresnel troughs have some advantages as do flat reflector Fresnel troughs. Flat reflector Fresnel troughs have the advantage that they can more easily be made from inexpensive, readily available, off-the-shelf materials. Curved parabolic reflector Fresnel troughs have the advantage that the number and size of the Fresnel reflector sections in the trough can be chosen by the designer. This is a result of the focal nature of curved parabolic reflectors. The designer of an Open Architecture Parabolic concentrator will want to find the optimum balance between the number and size of the curved Fresnel reflectors and the number and size of the open spaces designed to reduce wind loading. Conversely, with flat Fresnel reflector trough concentrators the number and size of the Fresnel reflector steps is rigidly determined by the size of the receiver and the concentration ratio of the concentrator. This is because each flat Fresnel reflector step must fully illuminate the receiver and they do not have the benefit of a focal property. Designers of flat Fresnel reflector Open Architecture troughs still have the option of choosing the size of the spacing between their Fresnel reflector steps and optimizing them for maximum reduction of wind loading without unduly increasing the overall trough size.

The same lattice support structure with aerodynamic contours described in the following Figure descriptions for Open Architecture trough concentrators with flat Fresnel reflectors is also applicable to Open Architecture curved parabolic reflector concentrators.

FIG. 6a shows a rear view of the lattice structure by which the Open Architecture concept of the present invention may be realized. FIG. 6a shows the lattice structure of one side of the Open Architecture Fresnel Concentrator shown in FIG. 1b. Here it is shown that the lattice structure minimally consists of horizontal members 8 and vertical structural members 9. Since the optical properties of the Fresnel Trough Concentrator require physical Fresnel reflector strips 1, it makes sense that the horizontal members 8 of the lattice structure be incorporated with and serve as the backing structure for the reflective surfaces of the Fresnel Trough Concentrator. Vertical structural members 9 are spaced apart and hold the horizontal members 8 in place and together they form a rigid lattice structure. If necessary, diagonal members 10 may be incorporated into the lattice structure to give it greater rigidity. The open spaces 5 necessary for air flow thru the lattice structure and wind loading reduction is established by the spacing of the horizontal members 8 mounted on the vertical structural members 9. In order to further reduce the wind loading on the lattice structure and the trough concentrator, aerodynamic contours 11 are incorporated as part of the surfaces of all structural elements (horizontal members 8, vertical structural members 9 and diagonal members 10) that are not optical surfaces. Thus the rear surfaces of the horizontal members 8, whose front surfaces 1 are the Fresnel reflectors of the trough concentrator are constructed with aerodynamic surfaces 11. Likewise, front, rear and side surfaces of the vertical structural members 9 and the diagonal members 10 are constructed with aerodynamic surfaces 11 in order to be as passive to wind flow as possible.

FIG. 6b shows a side view of the lattice structure, illustrating the aerodynamic contour 11 of the back side of the horizontal members 8 in cross section. Here it can be easily seen that the horizontal members 8 of the lattice structure serve a dual purpose; support for the Fresnel reflectors 1 of the trough concentrator and aerodynamic structural element.

FIG. 6c shows a top view of one of the lattice vertical structural members 9 illustrating their aerodynamic contours 11 in cross section. Here it can be seen that the surfaces of the vertical structural members 9 open and exposed to wind have aerodynamic contours 11 on all surfaces exposed to wind.

FIG. 7 shows a rear view of the lattice structure of one side of the Open Architecture Fresnel Concentrator shown in FIG. 2. Vertical structural members 9 hold the horizontal members 8 in place with equal spacing 5 between them.

Figure 8:
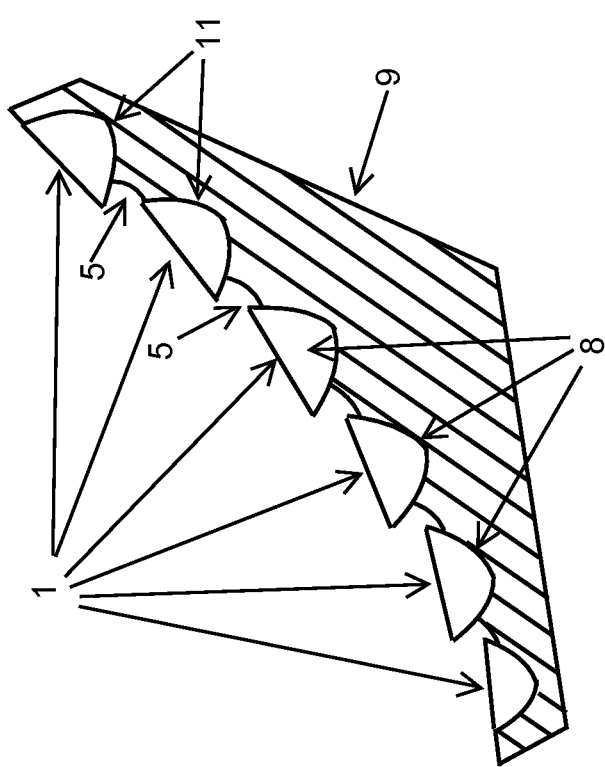
FIG. 8 shows a side view of the lattice support structure for the Fresnel Trough Concentrator shown in FIG. 2 and illustrating the Open Architecture structure of the present invention.

FIG. 8 shows a side view of the lattice structure of the concentrator of FIG. 2. Here one possible geometric configuration of the vertical members 9 is represented as well as one possible aerodynamic contour 11 of the backs of the horizontal members 8 is shown. Again equal spaces 5 are shown between the horizontal members 8 and the Fresnel reflectors 1.

Figure 9:
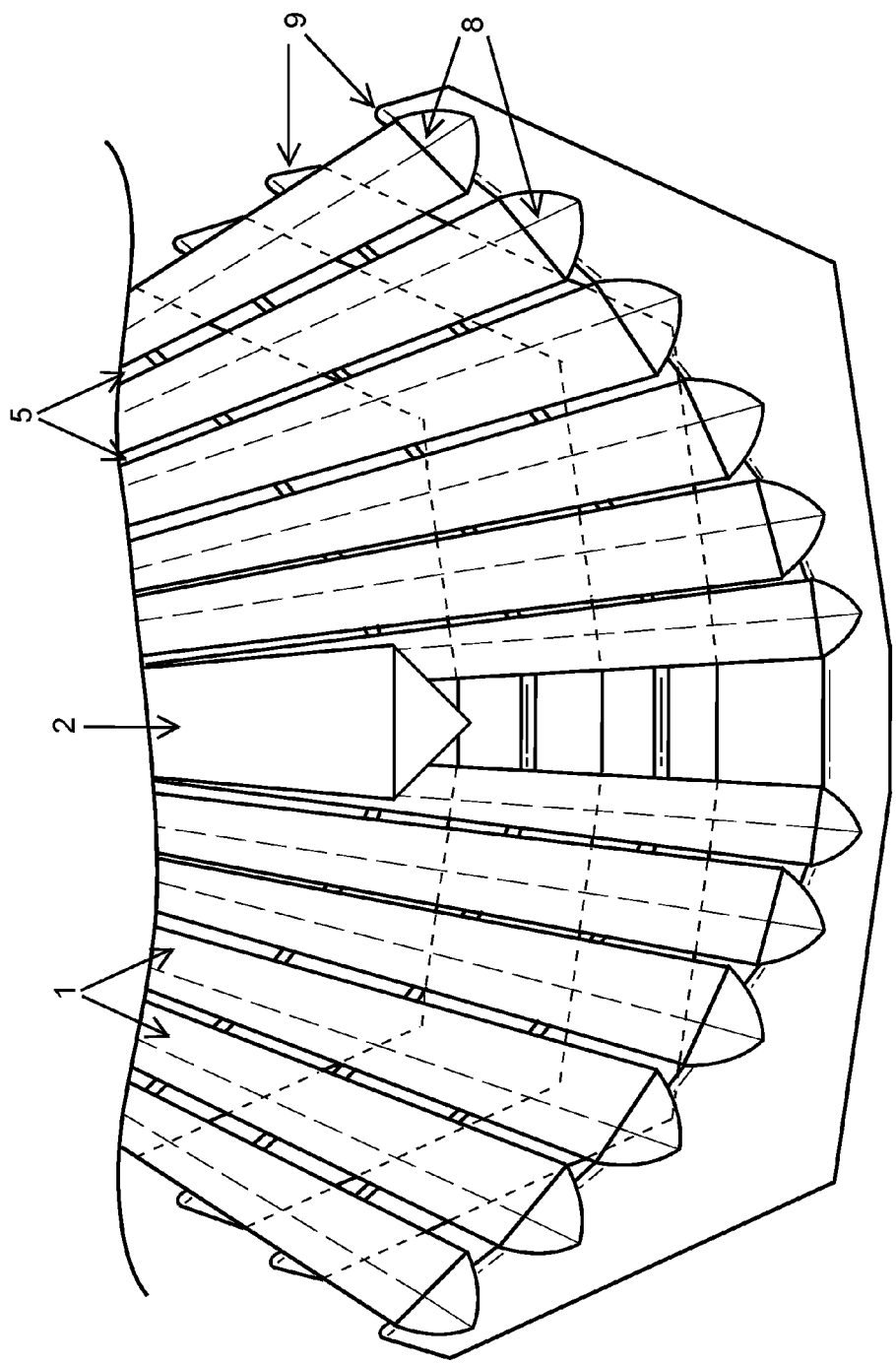
FIG. 9 shows a perspective view of the present invention showing the full Fresnel Trough Concentrator of FIG. 2 and illustrating the Open Architecture concept.

FIG. 9 is a perspective view of one embodiment of the present invention. FIG. 9 shows a full trough version of the concentrator of FIG. 2. Shown in this view are elements: 1 Fresnel reflector surfaces, 2 receiver, 5 equal open spaces between the horizontal members 8 and the reflectors 1 and 9 vertical members supporting the horizontal members 8 with equal spacing 5 between them.

Figure 10:
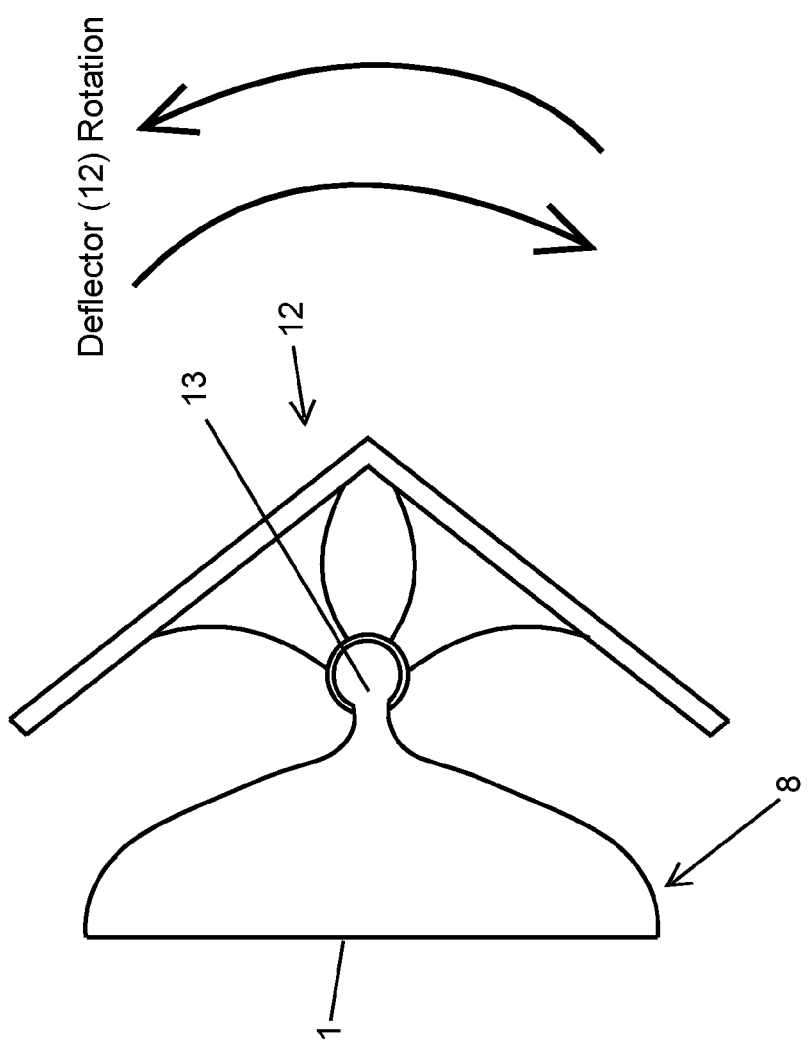
FIG. 10 shows a dynamic wind deflector that can be incorporated into the lattice support members of the Open Architecture structure.

FIG. 10 shows a dynamic version of the aerodynamic surfaces incorporated into the lattice support members of the Open Architecture structure of the present invention. Specifically, a self-adjusting aerodynamic pivoting wind deflector is shown. This structure consists of the lattice horizontal member 8, which supports the Fresnel reflector 1. Attached to the horizontal member 8 at a pivot 13 on the horizontal member 8 is a self-adjusting pivoting wind shield 12. Because of its' shape and the pivot it is mounted on this wind shield will automatically pivot and orient itself in wind to have its point facing the wind and thus present its aerodynamic surface into the wind thus reducing wind loading. It is here to be noted that this structure may also be incorporated as dynamic aerodynamic surfaces for the lattice vertical support members and diagonal support members.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A solar concentrator composed of a plurality of linear reflective strips arranged generally in a trough shaped cross-section and further oriented such that sunlight parallel to the trough central axis and falling upon said linear reflective strips is concentrated upon a linear receiver element located at a position along a trough central axis; said reflective strips incorporated as part of horizontal structural members and vertical structural members inter-connected with said horizontal structural members and disposed at right angles to said horizontal structural members; open air spaces disposed between said horizontal and vertical structural members creating a trough shaped lattice structure through which air can pass; said horizontal structural members incorporating aerodynamic contours on their non-reflective surfaces and said vertical structural members incorporating aerodynamic contours on their surfaces exposed to wind.

2. A solar concentrator composed of a plurality of linear reflective strips arranged generally in a trough shaped cross-section and further oriented such that sunlight parallel to the trough central axis and falling upon said linear reflective strips is concentrated upon a linear receiver element located at a position along a trough central axis; said reflective strips incorporated as part of horizontal structural members; diagonal structural members inter-connected with said horizontal structural members and disposed at oblique angles to said horizontal structural members; open air spaces disposed between said diagonal and horizontal structural members creating a trough shaped lattice structure through which air can pass; said horizontal structural members incorporating aerodynamic contours on their non-reflective surfaces and said diagonal structural members incorporating aerodynamic contours on their surfaces exposed to wind.

3. A solar concentrator composed of a plurality of linear reflective strips arranged generally in a trough shaped cross-section and further oriented such that sunlight parallel to the trough central axis and falling upon said linear reflective strips is concentrated upon a linear receiver element located at a position along a trough central axis; said reflective strips incorporated as part of horizontal structural members and vertical structural members inter-connected with said horizontal structural members and disposed at right angles to said horizontal structural members; diagonal structural members inter-connected with said horizontal and vertical structural members and disposed at oblique angles to said horizontal and vertical structural members; open air spaces disposed between said horizontal and vertical and diagonal structural members creating a trough shaped lattice structure through which air can pass; said horizontal structural members incorporating aerodynamic contours on their non-reflective surfaces and, said vertical and diagonal structural members incorporating aerodynamic contours on their surfaces exposed to wind.

4. The solar concentrator of claim 1 wherein the spaces between said horizontal structural members are disposed in a direction parallel to the trough central axis.

5. The solar concentrator of claim 2 wherein the spaces between said horizontal structural members are disposed in a direction parallel to the trough central axis.

6. The solar concentrator of claim 3 wherein the spaces between said horizontal structural members are disposed in a direction parallel to the trough central axis.

7. The solar concentrator of claim 1 wherein the spaces between said horizontal structural members are disposed in a direction at right angle to the trough central axis.

8. The solar concentrator of claim 2 wherein the spaces between said horizontal structural members are disposed in a direction at right angle to the trough central axis.

9. The solar concentrator of claim 3 wherein the spaces between said horizontal structural members are disposed in a direction at right angle to the trough central axis.

10. The solar concentrator of claim 1 wherein the spaces between said horizontal structural members are disposed in a direction at an oblique angle to the trough central axis.

11. The solar concentrator of claim 2 wherein the spaces between said horizontal structural members are disposed in a direction at an oblique angle to the trough central axis.

12. The solar concentrator of claim 3 wherein the spaces between said horizontal structural members are disposed in a direction at an oblique angle to the trough central axis.

13. The solar concentrator of claim 1 in which said linear reflective strips are flat.

14. The solar concentrator of claim 2 in which said linear reflective strips are flat.

15. The solar concentrator of claim 3 in which said linear reflective strips are flat.

16. The solar concentrator of claim 1 in which said linear reflective strips are curved and optically focusing.

17. The solar concentrator of claim 2 in which said linear reflective strips are curved and optically focusing.

18. The solar concentrator of claim 3 in which said linear reflective strips are curved and optically focusing.

19. A dynamic self-adjusting wind deflector for linear solar collector structural members consisting of an aerodynamically shaped structural member having a leading pointed edge and two trailing edges; said wind deflector mounted to said structural member by a pivot such that said wind deflector will be automatically rotated by wind force in response to wind direction to orient said wind deflector's leading edge pointing into the wind; said deflector shape, dimensions and mounting orientation relative to said structural member, shall be such that said deflector in conjunction with said structural member shall present an aerodynamic contour to wind that changes and adjusts to wind direction.

* * * * *